United States Patent

Fulmer et al.

[15] 3,665,957

[45] May 30, 1972

[54] CONTROL VALVE FOR A HYDRAULIC SYSTEM

[72] Inventors: Keith H. Fulmer; Deane K. Jenney, both of South Bend, Ind.

[73] Assignee: The Bendix Corporation

[22] Filed: Apr. 13, 1970

[21] Appl. No.: 27,552

[52] U.S. Cl. ..........................137/509, 137/544, 137/539.5, 303/10, 303/52
[51] Int. Cl. ..........................................................B60t 13/14
[58] Field of Search ..................137/509, 539.5, 514, 505.42, 137/544; 303/10, 52–54

[56] References Cited

UNITED STATES PATENTS

| | | | |
|---|---|---|---|
| 2,481,713 | 9/1949 | Bertea | 137/539.5 |
| 2,578,795 | 12/1951 | Gardiner et al. | 137/509 |
| 3,195,568 | 7/1965 | Pearl | 137/505.42 |
| 3,236,256 | 2/1966 | Valentine | 137/509 |
| 3,459,226 | 8/1969 | Schultz | 303/10 X |
| 3,466,099 | 9/1969 | Schultz | 303/10 X |
| 3,469,890 | 9/1969 | Fulmer | 303/10 X |
| 3,526,440 | 9/1970 | Blair | 303/52 X |

Primary Examiner—Milton Buchler
Assistant Examiner—John J. Mclaughlin
Attorney—William N. Antonis and Plante, Arens, Hartz, Smith and Thompson This Patent filed under Rule 47B.

[57] ABSTRACT

A fluid pressure control valve consisting of a housing with a bore therein. A valve sleeve with an internal division is inserted in the bore. A plug is fixed to one end of the sleeve to form a first chamber and a valve seat attached to the opposite end of a control chamber. A ball valve carried on a valve stem, whose diameter is larger than the valve seat, is contained in the control chamber. A valve return spring surrounding the valve stem biases the ball valve against the valve seat during normal operating pressures but during periods of high pressure allows the ball valve to move away from the seat to release this high pressure into a reservoir thereby preventing damage to the brake system.

3 Claims, 4 Drawing Figures

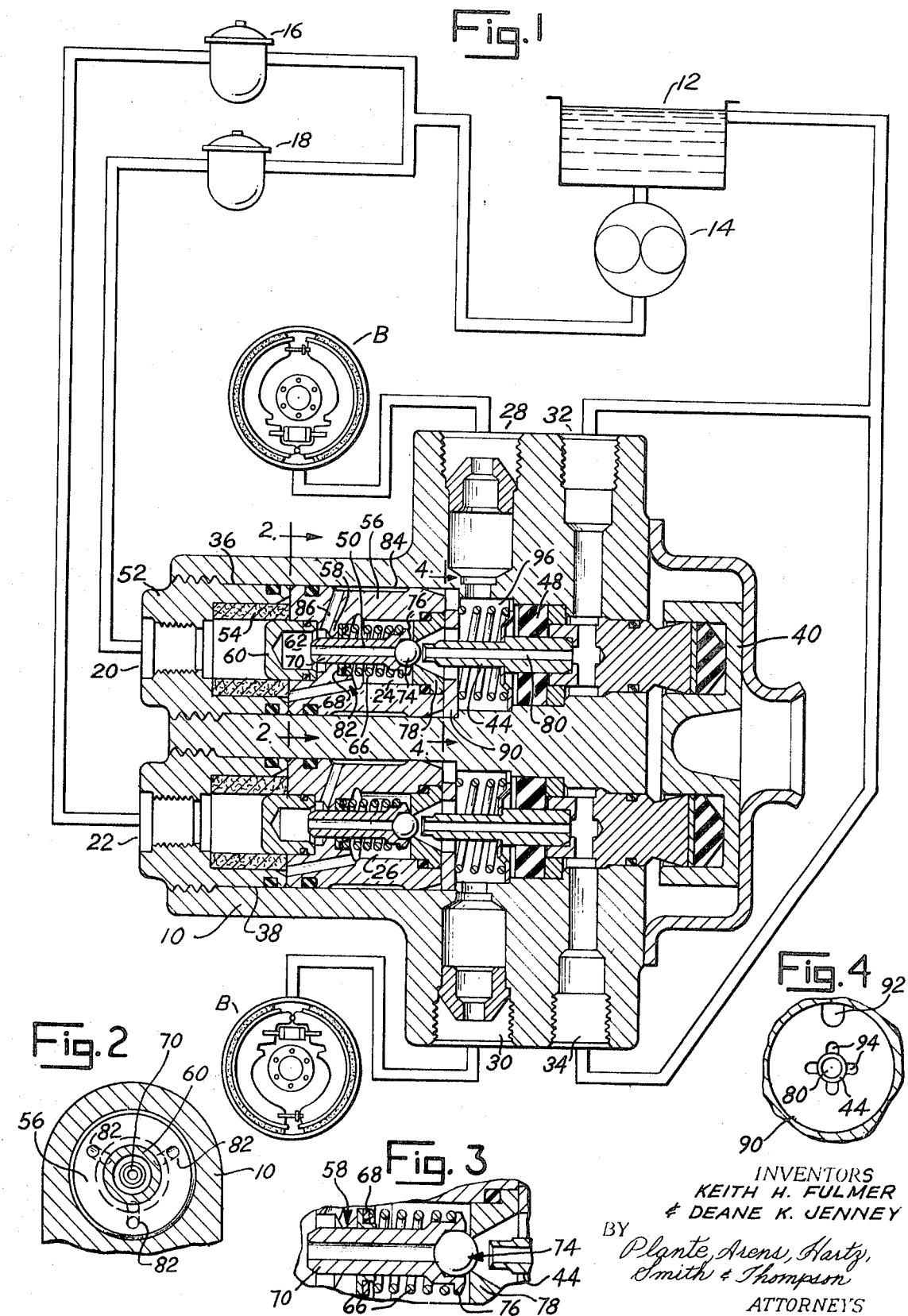

CONTROL VALVE FOR A HYDRAULIC SYSTEM

BACKGROUND OF THE INVENTION

This invention relates to an improved fluid control valve wherein the balanced plunger within the control chamber acts as a regulator during normal fluid pressure and a relief valve when the pressure in the system is greater than a predetermined value.

The prior art has recognized the need for a regulating valve and a relief valve in the delivery of high pressure fluid in the brake system; i.e., the Schultz, U.S. Pat. No. 3,459,266, provided a separate structural unit for each type of valve.

SUMMARY OF THE INVENTION

It is an object of this invention to provide a single valve structure which acts both as a regulating and relief valve, thus eliminating the need for a rupture disc now used, as shown by the Schultz patent mentioned above, to protect the brake system.

Another related object of the invention is to provide means for supplying the control chamber with pressure which acts on each side of the ball valve with equal intensity.

A further object of the present invention is to provide means for protecting the brake system from damaging high pressure.

Another object of the present invention is to provide a valve wherein the plunger has a stem with a larger diameter than the ball valve seat, so that the plunger will become unbalanced when a force greater than the valve spring is in the system, thereby preventing damage to the system.

These and other objects will become readily apparent to those skilled in the art from the drawings and the detailed description.

BRIEF DESCRIPTION OF THE DRAWINGS

In the drawings:

FIG. 1 shows a fluid pressure valve in cross section connected to a hydraulic system for transmitting brake pressure to the wheel cylinders of a vehicle, the components of which are schematically shown.

FIG. 2 is a sectional view taken long line 2—2 of FIG. 1 which shows the radial passages to the control chamber through the valve sleeve.

FIG. 3 is an enlarged sectional view of the valve stem and seat shown in FIG. 1.

FIG. 4 is an enlarged sectional view taken along line 4—4 of FIG. 1 which shows the tubular valve guide of the actuating mechanism.

DESCRIPTION OF THE PREFERRED EMBODIMENT

While the valve apparatus of this invention is particularly applicable and best understood in reference to a full hydraulic power braking system, those skilled in the art will readily recognize that it could be used in any hydraulic system. In such a system a valve housing 10 is connected in a hydraulic system comprising a fluid reservoir 12 and a hydraulic pump 14 which supplies accumulators 16 and 18 with fluid pressure. The accumulators 16 and 18 are respectively connected to inlet ports 20 and 22 of the valve housing. The fluid pressure flows through the control chambers 24 and 26 into either the discharge ports 28 and 30 connected to the individual wheel brakes (B) or fluid return ports 32 and 34 connected to the reservoir 12.

As shown in FIG. 1, the valve control means consists of a valve housing 10 with parallel tandem bores 36 and 38. Since the elements in each bore are the same, as can be seen in FIG. 1 of the drawing, only the elements in bore 36 will be described. Valve operating mechanism 40 contains a tubular member 44 inserted through seal member 48 of the housing into the bore 36 where retainer 90 keeps it in proper alignment at all times. Thereafter, the valve control means 50 is inserted and sealed in the bore. An end adapter 52, containing an anti-surge filter member 54 which abuts the valve sleeve 56 of the valve control means 60, is secured to the housing.

The valve control means 50 consists of a valve sleeve 56 internally divided by bearing member 58 into which a tubular plug member 60 is sealed to form a first chamber 62 within the valve sleeve. A valve return spring 66 is positioned by tabs 68 on wall 58. A tubular projection or valve stem 70, whose diameter is greater than the valve seat member 78, see FIG. 3, extends through the opening in bearing wall 58 and into the first chamber 62. This projection 70 is the valve stem for the ball valve 74. The ball valve 74 is attached to the valve stem 70 by bearing plate 76 which also keeps spring 66 in proper alignment around the valve stem. Valve seat member 78 is sealed in the valve sleeve 56 to form the valve control chamber 24.

The valve sleeve 56 contains several radial passages 82 (see FIG. 2) connecting the control chamber 24 with accumulator 18, or other source, which supplies the fluid pressure. The direct flow of the fluid from the accumulator 18 is broken up by the filter member 54 positioned adjacent the radial passages 82 to prevent pulsation in the system. By having several passages 82, the pressure which is received by the control chamber can be equally distributed to the ball valve. Thus, the possibility of a fluid pressure force moving the ball valve to one side and binding during sliding movement is thereby prevented.

The valve sleeve 56 has an annular groove 84 connected to passageway 86 which extends into its first chamber 62. The retainer 90 (see FIG. 4) adjacent the sleeve 56, has several openings 94 into chamber 96 and a U-shaped opening 92 allowing communication of the fluid pressure to groove 84. Thus, the means are provided whereby the same fluid pressure can act on the ball valve and the stem member as balancing forces.

The ball valve 74 is resiliently urged against the seat only by the force of the return spring 66. The force of the valve return spring is selected in accordance with the desired operating pressure for the brake system.

Under normal operating conditions, with the valve operating mechanism 40 at rest, fluid pressure from the accumulator 18 is transmitted to the valve control chamber 24. At any time when the pressure in the system is greater than the pressure which may be safely carried in the brake system the ball valve 74 will move away from the seat 78, due to the pressure differential across the valve caused by the differences in diameters of the stem and valve seat. With the ball valve unseated, the excess pressure passes through passage 80 of the valve operating mechanism 40 out the return port 32 and into the reservoir without damage to the brake system.

After the excess pressure has been relieved, the return spring 66 will seat the ball valve 74 on the seat 78. Since the activating mechanism 40 is in a rest position during the pressure relieving operation, retainer 90 will keep the tubular member 44 in position, to receive the fluid flow and in alignment with the ball valve 74, thus preventing any movement which could be caused by any side forces of the flowing fluid.

If the valve operating mechanism 40 is activated, the tubular member 44 will move the ball valve 74 away from seat member 78 allowing fluid pressure to pass between it and seat member 78 through openings 94 of the retainer 90 into chamber 96 and out port 28 to the individual wheel brake members. The ball valve 74 is held against the tubular member 44 of the operating mechanism 40 by the spring 66, thus closing the communication by passage 80 to the discharge port 32 and the reservoir 12. If fluid pressure from the accumulator 16, or any other source, in the control chamber 24 is greater than the system is safely designed to carry, a pressure differential across ball valve 74, due to the difference in diameter of stem 70 and tube 44 causes the valve return spring 66 to collapse. With the spring in a collapsed state, the ball valve moves away from the tubular member 44. With the ball valve and the tubular member 44 separated, the excess pressure is communicated to the reservoir through passage 80 and discharge port 32.

Thus, as described above, the single valve structure, because of the unique structure of the valve stem and valve seat member, acts as a regulating valve under normal conditions and in times of excess pressure a relief valve to protect the system from bursting failure. Moreover, our invention is not limited to protecting the brake system only when the brakes are activated, but is contained in the system to function continually to provide a release for excessive fluid pressure at all times.

While the invention has been described in considerable detail, we do not wish to be limited to the particular embodiment shown and described, and it is our intention to cover hereby all novel adaptations, modifications and arrangements thereof which come within the practice of those skilled in the art to which the invention relates.

We claim:

1. A fluid pressure control valve for regulating the flow of a fluid under pressure from a source to the wheel brakes in a braking system of a vehicle and for relieving high pressure surges above a predetermined level from the braking system to prevent internal damage thereof, said control valve comprising:

a housing having a central bore therein with an inlet port connected to said source of fluid under pressure, an outlet port connected to said wheel brakes and a return port connected to a reservoir of said source;

sleeve means located in said central bore having an internally dividing bearing wall with an axial opening, said sleeve means having a plurality of equally spaced radial passages extending from one end adjacent said inlet port past said bearing wall to the interior of said sleeve and an external annular groove connected by openings to said outlet port on the other end and by a passageway to the interior of said sleeve on the opposite side of the radial passages adjacent said bearing wall;

plug means for sealing the interior of the sleeve means on said one end to form a first chamber with said bearing wall, said first chamber being in communication exclusively with said outlet port through said passageway;

filter means surrounding said plug means and covering the radial passages on the one end of said sleeve means;

adapter means surrounding said filter means and secured to said housing with a central opening forming said inlet port for retaining said sleeve means in said central bore;

seat means connected to the other end of said sleeve means having a centrally located opening in axial alignment with the opening in the bearing wall, said opening in the seat means being of a smaller diameter than the opening in the bearing wall, said seat means and said bearing wall forming a control chamber in said sleeve means;

stem means retained in and of the same diameter as said opening in the bearing wall having one end extending into said first chamber and the other end extending into said control chamber;

ball means retained on the other end of said stem means; and resilient means positioned between said bearing wall and the other end of said stem means for urging said ball means against said seat means, said high pressure surges above a predetermined level acting on the surface area of said ball means corresponding to the difference in diameter of the opening in the bearing wall and the seat means to overcome said resilient means to permit the high pressure surges to escape to said reservoir through the return port.

2. The control valve as recited in claim 1 wherein said plurality of radial passages distribute high pressure surges of fluid uniformly to said control chamber to prevent binding of said stem means upon movement.

3. The control valve as recited in claim 2 wherein said filter means initially reduces surges of fluid and prevents foreign matter from reaching the control chamber.

* * * * *